United States Patent
Geva et al.

(10) Patent No.: US 9,276,689 B2
(45) Date of Patent: Mar. 1, 2016

(54) PLUGGABLE PACKET MASTER CLOCK

(71) Applicant: RAD DATA COMMUNICATIONS LTD., Tel Aviv (IL)

(72) Inventors: Alon Geva, Hod Hasharon (IL); Yaakov Stein, Jerusalem (IL)

(73) Assignee: RAD DATA COMMUNICATIONS LTD., Tel Aviv, IL (US)

( * ) Notice: Subject to any disclaimer, the term of this patent is extended or adjusted under 35 U.S.C. 154(b) by 501 days.

(21) Appl. No.: 13/625,876

(22) Filed: Sep. 25, 2012

(65) Prior Publication Data

US 2014/0085141 A1    Mar. 27, 2014

(51) Int. Cl.
*G01S 19/13* (2010.01)
*H04J 3/06* (2006.01)

(52) U.S. Cl.
CPC . *H04J 3/0644* (2013.01); *H04J 3/06* (2013.01)

(58) Field of Classification Search
CPC .................................. H04J 3/06; H01J 3/0644
USPC ...................................................... 342/357.51
See application file for complete search history.

(56) References Cited

U.S. PATENT DOCUMENTS

| 2002/0073228 A1 | 6/2002 | Cognet et al. |
| 2009/0225743 A1 | 9/2009 | Nicholls et al. |
| 2011/0200051 A1 | 8/2011 | Rivaud et al. |

FOREIGN PATENT DOCUMENTS

FI    7530 U    6/2007

OTHER PUBLICATIONS

IEEE 1588TM (PTP) in Communication Networks; Application Note; Oscilloquartz; No. 21/2010; Created: Aug. 2010.
Kenneth C. Budka et al; Communication Network Architecture and Design Principles for Smart Grids; Alcatel-Lucent; Bell Labs Technical Journal 15(2), 205-228 (2010); Published by Wiley Periodicals, Inc. Published online in Wiley Online Library (wileyonlinelibrary.com) • DOI: 10.1002/bltj.20450.
Ski Ilnicki et al; Performance of Transparent Clock over Existing Network Elements using Modified Pluggable Gigabit Interface, 7 pages; Conference on IEEE-1588: Standard for a Precision Clock Synchronization Protocol for Networked Measurement and Control Systems; Oct. 2-4, 2006, Gaithersburg, Maryland.
International Search Report mailed Feb. 6, 2014 for PCT/IB2013/058764.
Third Party Observation, European Communication under Article 115 EPC from European Application 13801768.6 dated Nov. 26, 2015; 27 pages.
IEEE-1588 Standard for a Precision Clock Synchronization Protocol for Networked Measurement and Control Systems, John Eidson, Agilent Technologies, Inc., Oct. 2015; 94 pages.

(Continued)

*Primary Examiner* — Frank J McGue
(74) *Attorney, Agent, or Firm* — A.C. Entis-IP Ltd.

(57) ABSTRACT

Apparatus for providing timing information, the apparatus comprising: a primary reference time clock (PRTC) that provides a reference time of day (ToD) and a reference frequency; a packet master clock that receives the ToD and reference frequency and is configured to distribute timing to a slave clock in accordance with a timing over packet procedure responsive to the ToD and the reference frequency; and a housing that houses the PRTC and packet master clock which may be plugged into a conventional small form factor (SFP) compliant cage to connect the packet master clock to a packet switched network (PSN).

21 Claims, 3 Drawing Sheets

(56) References Cited

OTHER PUBLICATIONS

Time Source 3500, GPS Primary Reference Source, User's Guide, Symmetricom Inc.; Revision M-Oct. 2007; 194 pages.

ITU-T Draft Recommendation G.8272, as agreed during the SG15/13 meeting held in Helsinki, Jun. 4-8, 2012, 13 pages.

Jean-Loup Ferrant et al.; Synchronous Ethernet: A Method to Transport Synchronization, IEEE Communications Magazine 2008; pp. 1-7.

PLUGGABLE PACKET MASTER CLOCK

TECHNICAL FIELD

Embodiments of the invention relate to timing distribution in packet switched networks.

BACKGROUND

Modern communication networks typically link many different types of mobile and/or stationary communication terminals. Among the communication networks are the well known cellular phone backhaul networks and the less familiar smart grid networks, which operate to control and distribute energy. The networks may link communication terminals, such as by way of example, cellular phones, computers, and communication enabled industrial plant equipment, and provides the terminals with an ever increasing menu of voice, video, and data communication services.

The networks operate to transport information from one to another of their respective terminals using signals containing information relevant to the services that the networks provide. In propagating from a source terminal to a destination terminal of a given communication network, the signals generally propagate through a plurality of network nodes. At each node the signals are received and then, optionally after processing in the node, are forwarded toward their destination. Typically, the networks are packet switched networks (PSNs) and information propagated by the networks are packaged in packets configured in accordance with a suitable packet technology such as multiprotocol label switching (MPLS), internet protocol (IP), and/or Ethernet.

Various services, such as cellular telephony and data, when transported over PSN networks, require for their proper operation that devices in the PSN network be synchronized to highly accurate timing information. Timing information comprises a highly accurate reference frequency and/or time of day (ToD). ToD defines a current year, month, day, hour, minute, second, and fractions of a second, referenced to some standard, such as International Atomic Time (TAI) or Universal Coordinated Time (UTC). A network device in a PSN network may receive timing information from various sources and in accordance with various synchronization procedures. For example, a network device in a PSN may receive timing information directly from Global Navigation Satellite System (GNSS) transmissions, such as the US Global Positioning System (GPS), the Russian GLONAS, or the Chinese Beidou satellite transmissions, or by participating in a PSN "timing over packet" procedure, executed in accordance with a suitable packet timing distribution protocol, whereby a "packet slave clock" is synchronized to a "packet master clock".

Timing over packet is generally provided by a system of clocks comprising a single reference clock referred to as a "packet grand master clock" that communicates and synchronizes time with at least one packet slave clock. The packet grand master clock receives a frequency reference and a time of day (ToD) reference from a highly accurate reference clock, such as a Primary Reference Time Clock (PRTC). A PRTC may provide the frequency reference as an isochronous train of pulses, referred to as "clock pulses", characterized by an accurate and stable pulse repetition frequency (e.g., 10 MHz). The PRTC may provide signals for determining ToD as a sequence of narrow pulses having a repetition rate at one pulse per second (1-PPS), with each pulse accompanied by a time code that associates the pulse with a year, month, day, hour, minute, and second, referenced to a standard such as TAI or UTC. The PRTC may comprise a highly stable Cesium or Rubidium atomic clock in order to maintain highly accurate frequency. Additionally or alternatively, it may comprise a GNSS radio receiver in order to receive accurate ToD information from GNSS satellite transmissions. The reference frequency provided by a PRTC is generally required to be accurate to better than 1 part in $10^{11}$ and the ToD accurate to ±100 ns (nanosecond) relative to UTC. The packet master clock repeatedly, and usually at regular time intervals, synchronizes each packet slave clock responsive to the reference frequency and ToD that it receives from the PRTC, in a process referred to as "timing distribution".

Timing distribution involves a packet master clock and packet slave clock exchanging a sequence of timing packets configured in accordance with communication protocols of the network. Commonly used protocols are Network Time Protocol (NTP), versions of which are defined in RFC-1305 and RFC-5905, and Precision Time Protocol (PTP), versions of which are defined in IEEE-1588-2002 and IEEE-1588-2008 (often called 1588-v2). The timing packets comprise timing information, such as "timestamps", which the packet slave clock records, and which define times at which the timing packets egress and/or ingress the master clock and/or the slave clock. Upon completion of a transaction, the packet slave clock has a record comprising a set of timestamps that it uses to synchronize itself to the packet master clock.

Typically, a packet master clock of a PSN distributes timing to a plurality of packet slave clocks, each of which is located at a different node of a plurality of nodes of the network. To provide a satisfactory degree of reliability, the packet master clock may comprise redundant components, such as a back-up power supply and redundant packet transmission and reception circuitry. Due to the expense of the PRTC and packet master clock, and in order to ensure consistency, the network generally comprises a single packet master clock connected to the physical layer of the network at a central location in the network.

Packets propagating between the same two nodes in a PSN may experience different transit times, referred to as propagation delays, in propagating between the two nodes. Variations in propagation delay (propagation delay variation—PDV) may result from variations in queuing delays in network elements along paths that packets travel between the nodes and/or from packets traveling along different paths between the nodes. A difference between a propagation delay from a first node to a second node, and a propagation delay from the second node to the first node is referred to as delay asymmetry. Consistent delay asymmetry may result from the path from the second node to the first node not coinciding with the path from the first node to the second. In addition to causes of delay asymmetry and PDV resulting from the logical structure and operation of the PSN network noted above, delay asymmetry and PDV may also be generated by changes in physical hardware comprised in the physical layer supporting the PSN. Such changes may for example comprise changes in physical connectors, fiber and/or copper cabling, and/or interface circuitry. For example, delay asymmetries and PDVs of hundreds of nanoseconds (depending on cable length) may be caused by environmental changes affecting cabling and cable connectors. Overall, delay asymmetries and PDVs can be on the order of 10 s or even 100 s of milliseconds.

Delay asymmetries and PDVs inherent in a PSN network degrade the quality of timing recovered by a packet slave clock using timing over packet protocols. Furthermore, as the number of nodes in a PSN network increases and a number of alternative communication paths between a master clock and slave clocks increases, the difficulty, expense, and bandwidth overhead incurred in distributing timing to the network clocks increases.

SUMMARY

An embodiment of the invention relates to providing a packet master clock housed in a housing that may be plugged into a conventional small form factor (SFP) compliant cage located in, by way of example, a PSN switch, router, or end device, that enables connecting the packet master clock to the PSN. Optionally, the packet master clock distributes timing according to the IEEE 1588 protocol. Optionally, the packet master clock comprises a GNSS receiver from which it receives timing information. Hereinafter, a packet master clock in accordance with an embodiment of the invention may be referred to as a pluggable packet master clock (PPMC). A PPMC enhances functionalities of a host device into which it is plugged with functionalities of a packet master clock.

An SFP compliant cage refers to a socket configured to receive a small communication module such as a Small Form-factor Pluggable (SFP) module, an Enhanced Small Form-factor Pluggable (SFP+) module, a 10G Form-factor Pluggable (XFP) module, a 100G Form-factor Pluggable (CFP) module, and a Gigabit Interface Converter (GBIC) module, specified by an industry groups in agreements known as "multisource agreements (MSA)". Multisource agreements specify electrical, optical, and physical features of the modules and sockets, referred to as "cages", into which the modules may be plugged. "SFP" may be used generically to reference small communication modules and cages that are compliant with any of the MSA agreements.

In an embodiment of the invention, a PPMC comprises a GNSS receiver that generates a ToD and a reference frequency responsive to signals received from GNSS satellites. The PPMC comprises a PRTC that receives said GNSS signals and generates the ToD and the reference frequency, and a packet master clock to which it provides the received reference frequency and ToD. In the following we will usually refer to GNSS satellites, transmissions, and receiver, as GNSS satellites, transmissions, and receiver, without limiting ourselves to a specific GNSS.

In an embodiment of the invention, each of a plurality of network elements of a communication network is provided with its own PPMC, thus creating a network having a dispersed configuration of packet master clocks, each packet master clock maintaining synchronization with other packet master clocks in the network without recourse to a timing distribution protocol. These PPMCs may then distribute timing to nearby network elements, resulting in a network with a plurality of packet master clocks, instead of a single centrally located packet grand master clock.

By providing a plurality of network element each with its own PPMC, in accordance with an embodiment of the invention, end point nodes that may require accurate timing, are generally closer than they would be in a conventionally configured network to a source of accurate timing information. As a result, PDV and delay asymmetries that may degrade synchronization of the end point nodes are reduced, and the endpoints may benefit from improved quality of timing and functioning of services that are dependent on accurate synchronization with other communication devices in the network. In addition, distributed PPMCs may reduce bandwidth dedicated to distributing timing.

The network may also benefit from reduced sensitivity to timing degradation resulting from loss of line of sight reception of signals from GNSS satellites. In an urban environment, loss of line of sight to GNSS satellites and consequential loss of GNSS timing signals may for example, result from masking by high rise buildings. Loss of GNSS timing signals may also result from deliberate or unintentional jamming.

By providing a plurality of the network elements with independent PPMCs, the network may comprise a relatively large number of clocks capable of functioning as PRTCs and packet master clocks that are spatially dispersed. The relative large number and spatial dispersion of the PPMCs reduces a probability that all the PPMCs in the network will simultaneously suffer a GNSS outage and leave the network without an accurate ToD and frequency reference. The disposition of a large number of spatially dispersed PPMCs may provide the network with substantially improved robustness in maintaining timing quality.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear and a numeral labeling an icon representing a given feature in a figure may be used to reference the given feature. Dimensions of components and features shown in the figures are chosen for convenience and clarity of presentation and are not necessarily shown to scale.

DETAILED DESCRIPTION

Figure 1A:
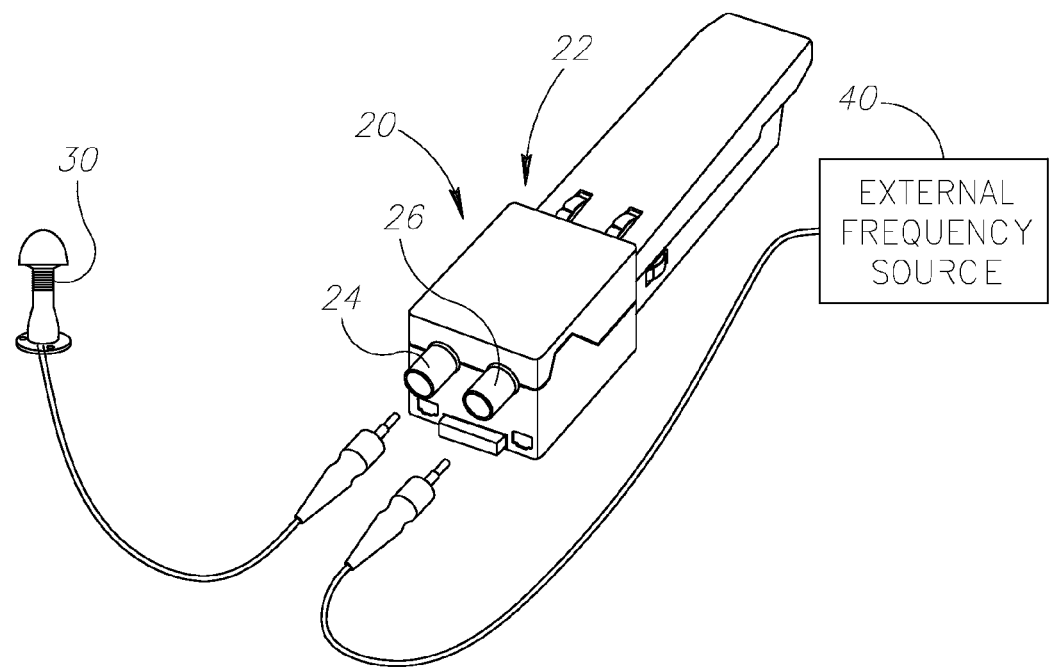
FIG. 1A schematically illustrates a PPMC in accordance with an embodiment of the invention.

FIG. 1A schematically shows a PPMC 20 in accordance with an embodiment of the invention. PPMC 20 is housed in a small form factor pluggable housing 22 suitable for insertion into a standard SFP cage. Optionally, housing 22 comprises input connectors 24 and 26, which may be BNC connectors, for connecting a GNSS antenna 30 and an external reference frequency source 40 respectively to internal circuitry of the PPMC.

Figure 1B:
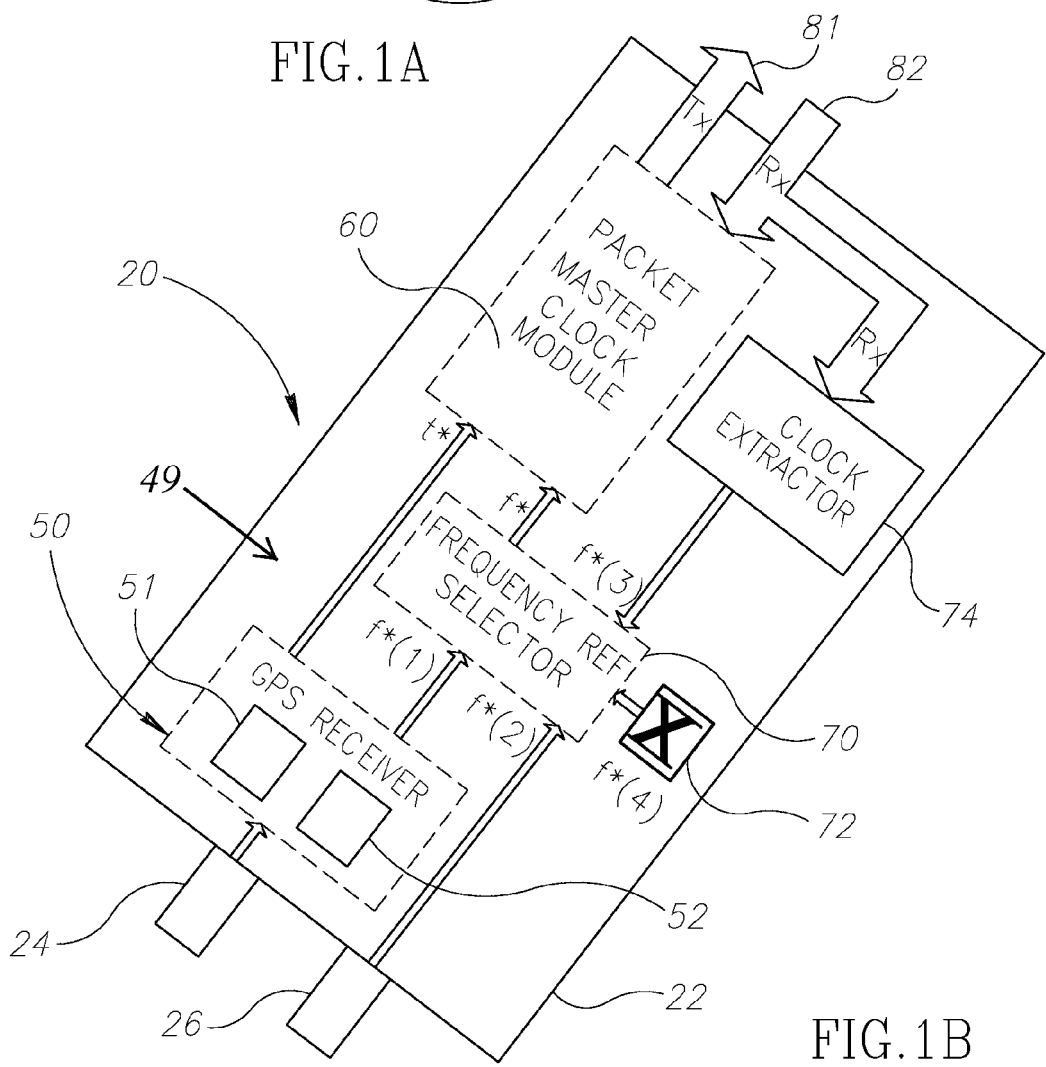
FIG. 1B schematically illustrates components that the PPMC shown in FIG. 1A in accordance with an embodiment of the invention.

FIG. 1B shows a schematic block diagram of circuit components comprised in PPMC 20, in accordance with an embodiment of the invention. The PPMC optionally has a PRTC, 49 comprising a GNSS receiver 50 that includes an RF front end 51 for receiving transmissions from GNSS satellites, and a GNSS processor 52. GNSS processor 52 processes transmissions received by front end 51 to recover a ToD, noted as t* in FIG. 1B, and a prospective reference frequency, f*(1), from the GNSS satellite signals.

In an embodiment of the invention, GNSS receiver 50 transmits t* to a packet master clock module 60 and optionally transmits the prospective reference frequency f*(1) to a reference frequency selector 70 that also receives prospective frequency signals f*(2), f*(3) and f*(4). Prospective reference frequency f*(2) is generated by external reference frequency source 40 (FIG. 1A). Prospective reference frequency f*(4) is generated by a local oscillator 72, such as a quartz oscillator or a miniature atomic clock, internally housed in housing 22 and optionally comprised in PRTC 49. Prospective reference frequency f*(3) is recovered by a "clock extractor" 74, optionally comprised in PRTC 49, from the physical data rate of signals that PPMC 20 receives from a backplane of a PSN network element (not shown) into which it is plugged. PPMC 20 is connected to the backplane by transmit and receive ports 81 and 82 respectively when the PPMC is plugged into an SFP cage of the network element. Reference frequency selector 70 determines a reference frequency f* signal responsive to prospective reference frequencies f*(1), f*(2), f*(3), and f*(4). Reference frequency selector 70 transmits reference frequency f* to packet master clock module 60 for use in distribution of timing through transmit port 81 to the PSN and thence to packet slave clocks connected to the PSN.

It is noted that whereas in the above description a ToD is generated responsive to a GNSS transmission, a PPMC, such as PPMC 20, in accordance with an embodiment of the invention may generate and/or receive a plurality of prospective ToDs and comprise a ToD selector that selects a reference ToD from amongst the plurality of prospective reference ToDs. For example, the ToD selector may receive a prospective ToD generated by processor 52 and an additional prospective ToD via a suitable receive port from an independent source, such as an external GNSS receiver or an external PRTC.

It is further noted that whereas PRTC 49 determines a reference frequency from a plurality of four reference frequencies, a PPMC in accordance with an embodiment of the invention may determine a reference frequency from a number of prospective frequencies different from four. Optionally, the PPMC comprises a PRTC that does not determine a reference frequency from a plurality of prospective reference frequencies but provides a reference frequency that is always either f*(1), f*(2), f*(3), or f*(4).

Figure 2:
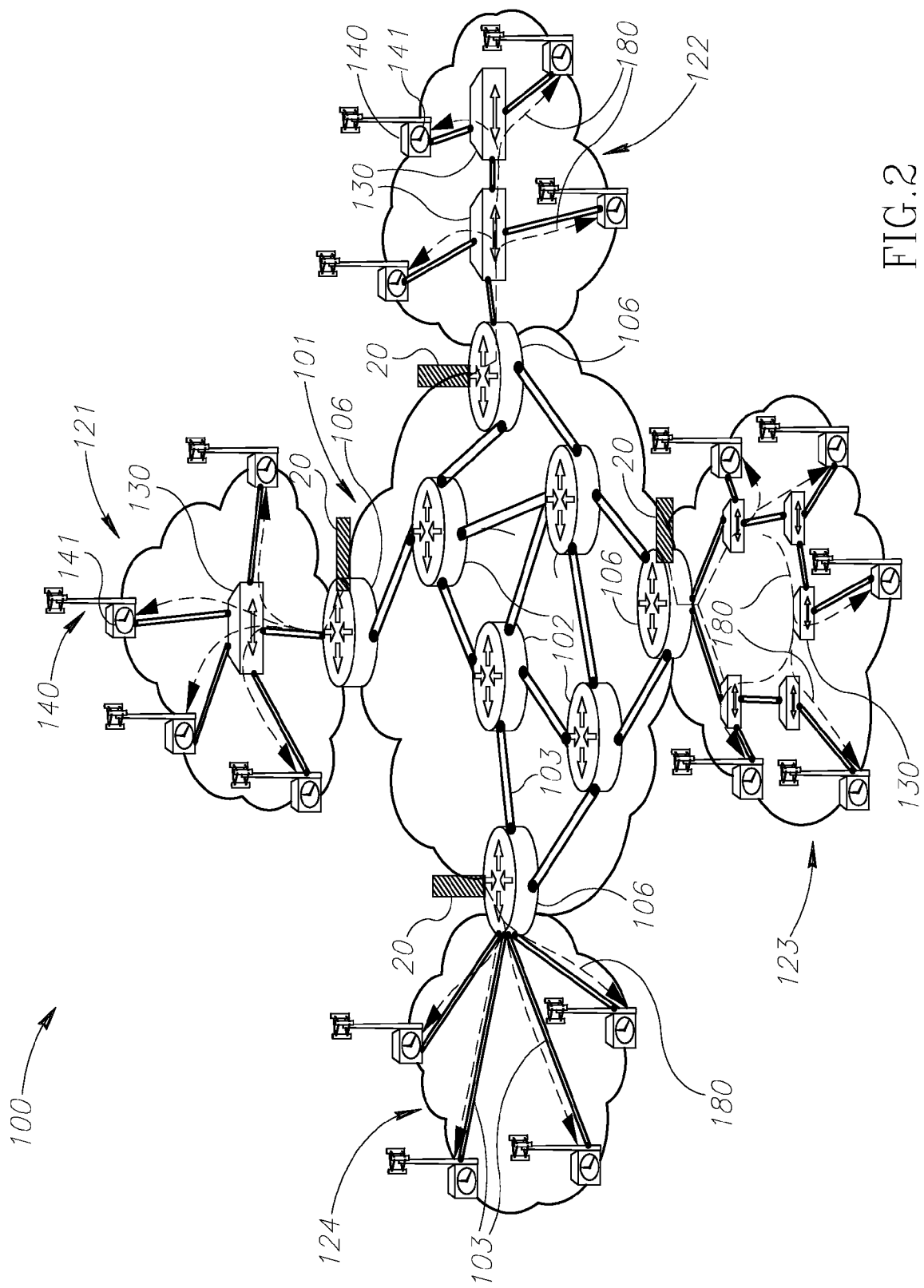
FIG. 2 schematically shows a cellular network comprising elements that are synchronized by PPMCs in accordance with an embodiment of the invention.

FIG. 2 schematically shows PPMCs 20 deployed to provide timing over a PSN 100, in accordance with an embodiment of the invention. PSN network 100 is assumed, by way of example, to be a cellular phone backhaul network comprising a plurality of four access networks 121, 122, 123, and 124, which connect subscribers to an aggregation network 101. Aggregation network 101 connects the access networks to a cellular phone core network (not shown). Each access network may comprise a plurality of base stations 140.

Aggregation network 101 comprises a plurality of switches and/or routers 102, hereinafter referred to generically as aggregation routers 102, connected to each other by communication links 103, which may, by way of example, be provided by, optical fibers, copper cables, and/or microwave links, and suitable connectors. Aggregation routers 102 transmit and receive voice, video, and data communication packets via communication channels between a plurality of edge devices 106, which may router or switches, that interface access networks 121, . . . , 124 with aggregation network 101. Edge devices 106 and aggregation routers 102 generally comprise a plurality of SFP cages (not shown) for connecting edge devices 106 and routers 102 to network 100.

Each access network 121, . . . , 124 may comprise a plurality of base stations 140 each of which transmits and receives wireless signals at accurately defined radio frequency (RF) carrier frequencies to and from user equipment (UE) (not shown) in a limited geographical area referred to as a "cell" of the network. The wireless signals carry voice, video, and/or data to and from the UEs, which may be cellular phones, laptops configured with cellular access, tablets, ebook readers, etc. Base stations 140 in a given access network 121, . . . , 124, are connected to an associated edge device 106 that interfaces the given access network to aggregation network 101 by a configuration of communication links 103.

Each base-station 140 comprises or has access to its own "local" clock 141 that provides clock signals for frequency and ToD referencing the base-station operations. To transport communication packets and provide network services at an acceptable QoS, all base-station clocks 141 comprised in access networks 121, . . . , 124 of cellular phone network 100 generally have to be synchronized to substantially a same reference frequency, and in many cases to a ToD that coincides substantially with UTC.

In an embodiment of the invention, a PPMC 20 is plugged into an SFP cage (not shown) of each edge device 106. Each PPMC 20 directly provides the edge device 106 into which it is plugged with a substantially same reference frequency f*, and with ToD t*, that coincides substantially with UTC time, responsive to GNSS satellite transmissions. As a result, edge devices 106 in aggregation network 101 may be maintained substantially synchronized to each other in accordance with an embodiment of the invention without, in general, transmission of timing packets over links connecting the edge routers to aggregation network 101. Aggregation network 101 may therefore not only be able to function with a reduced allocation of bandwidth for distributing timing, its network elements may need not be upgraded to introduce on-path support for timing packets. Edge devices 106 may therefore benefit from improved timing quality and stability, and hence improved QoS relative to cellular phone networks that are conventionally configured to distribute timing.

In addition, an edge device 106 hosting a PPMC 20 in accordance with an embodiment of the invention, may function as a PRTC that provides timing information responsive to GNSS timing information, and as a packet master clock referenced to the GNSS timing information for distributing timing to base-station clocks 141 in an access network 121, . . . , or 124. A given edge device 106 may, for example, transmit timing packets to distribute timing to base station slave clocks 141 in the access network 121, . . . , 124 to which the given edge device 106 is connected. Propagation paths of timing packets between the given edge device 106 and slave clocks 141 in the access network to which the PPMC is connected are indicated by dashed arrow lines 180. Generally, propagation paths 180 are physically shorter and pass through a smaller number of communication links 103 and network nodes than propagation paths of timing packets in a conventionally configured cellular phone network. Base stations 140 in each access network 121, . . . , 124 may therefore evidence improved timing quality and stability, and hence improved QoS relative to cellular phone networks that are conventionally configured to distribute timing.

Figure 3:
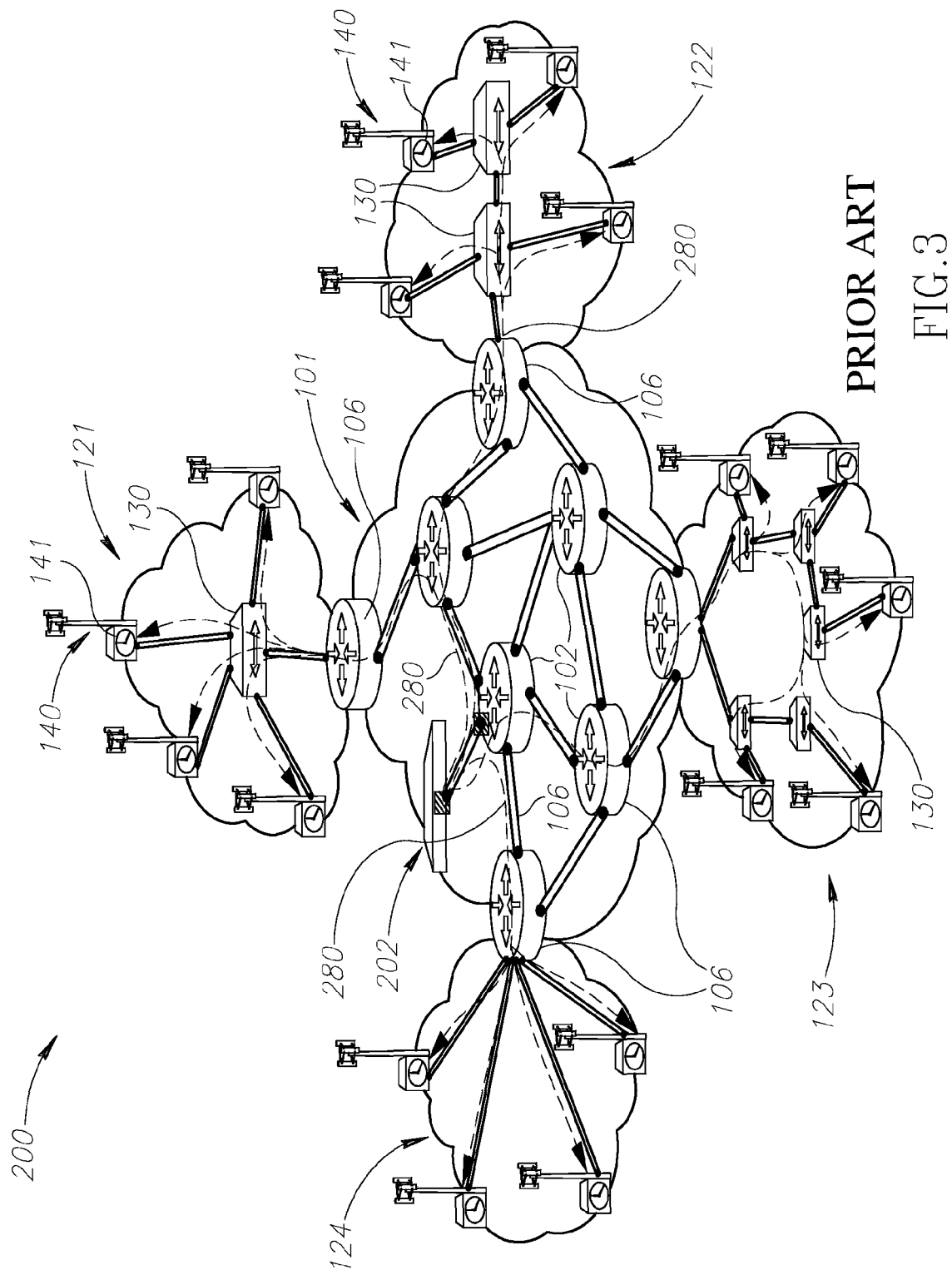
FIG. 3 schematically shows the cellular network shown in FIG. 2, in which elements of the network are synchronized by a conventional packet master clock and packet slave clocks.

For comparison with cellular phone network 100 configured to distribute timing using PPMCs 20 in accordance an embodiment of the invention, FIG. 3 schematically shows a cellular phone network 200 conventionally configured to distribute timing. Cellular phone network 200 is identical to cellular phone network 100 except that it does not comprise PPMCs, such as PPMCs 20, and distributes timing from a conventional PRTC (not shown) and packet grand master clock 202.

Packet grand master clock 202 is connected to aggregation network 101 so that it may exchange timing packets with any of slave clocks 141 in network 200 via communication channels provided by the backhaul network. Propagation paths of the timing packets are indicated by dashed arrow lines 280 and are readily seen to be substantially longer and passing through a greater number of communication links 103 and network nodes than propagation paths 180 of cellular phone network 100 shown in FIG. 2. As a result, quality and stability over time of synchronization of cellular phone network 200 may be inferior to that provided by cellular phone network 100.

Whereas quality and stability of synchronization of cellular phone network 200 may be improved by providing network 200 with more than one conventional packet master clock 202, conventional packet master clocks are relatively expensive. Conventional packet master clocks are also substantially more complicated to install than a PPMC 20, and the cabling and cable connectors used to connect a conventional packet master clock to a closest network element are a source of asymmetry and packet delay variation that contribute to degrading synchronization.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. Apparatus for providing timing information, the apparatus comprising:
    a primary reference time clock (PRTC) that is operable to provide a reference time of day (ToD) and a reference frequency;
    a packet master clock that receives the ToD and reference frequency and is configured to distribute timing to a slave clock in accordance with a timing over packet procedure responsive to the ToD and the reference frequency; and
    a housing that houses the PRTC and the packet master clock, the housing being suitable for plugging into a conventional small form factor (SFP) compliant cage to connect the packet master clock to a packet switched network (PSN).

2. Apparatus according to claim 1 wherein the PRTC comprises:
    a global satellite navigation system (GNSS) receiver that receives GNSS transmissions transmitted by GNSS satellites; and
    a GNSS processor that processes received GNSS transmissions to generate the reference frequency.

3. Apparatus according to claim 1 wherein the PRTC comprises an internal oscillator that generates the reference frequency.

4. Apparatus according to claim 1 wherein the PRTC comprises an input for receiving the reference frequency from an external frequency source.

5. Apparatus according to claim 4 wherein the PRTC comprises a clock extractor that generates the reference frequency responsive to a physical data rate of a backplane of a network element of the SFP comprising the SFP cage into which it the apparatus is plugged.

6. Apparatus according to claim 1 wherein the PRTC comprises:
    a global satellite navigation system (GNSS) receiver that receives GNSS transmissions transmitted by GNSS satellites; and
    a GNSS processor that processes received GNSS transmissions to generate the ToD.

7. Apparatus according to claim 1 wherein the PRTC comprises an input for receiving the reference ToD from an external source.

8. Apparatus according to claim 1 wherein the PRTC comprises a frequency selector that receives a plurality of prospective reference frequencies and selects the reference frequency from the plurality of prospective reference frequencies.

9. Apparatus according to claim 8 wherein the PRTC comprises:
    a global satellite navigation system (GNSS) receiver that receives GNSS transmissions transmitted by GNSS satellites; and
    a GNSS processor that processes received GNSS transmissions to generate a prospective reference frequency of the plurality of reference frequencies.

10. Apparatus according to claim 8 wherein the PRTC comprises an internal oscillator that generates a prospective reference frequency of the plurality of reference frequencies.

11. Apparatus according to claim 8 wherein the PRTC comprises an input for receiving a prospective reference frequency of the plurality of reference frequencies from an external frequency source.

12. Apparatus according to claim 8 wherein the PRTC comprises a clock extractor that generates a prospective reference frequency of the plurality of reference frequencies responsive to a physical data rate of a backplane of a network element of the SFP comprising the SFP cage into which it the apparatus is plugged.

13. Apparatus according to claim 1 wherein the PRTC comprises a ToD selector that selects a reference ToD from amongst a plurality of prospective reference ToDs.

14. Apparatus according to claim 13 wherein the PRTC comprises:
    a global satellite navigation system (GNSS) receiver that receives GNSS transmissions transmitted by GNSS satellites; and
    a GNSS processor that processes received GNSS transmissions to generate a prospective reference ToD of the plurality of reference ToDs.

15. Apparatus according to claim 13 wherein the PRTC comprises an input for receiving a prospective reference ToD from an external source.

16. Apparatus according to claim 1 wherein the timing over packet procedure conforms to IEEE-1588-2008.

17. Apparatus according to claim 1 wherein the timing over packet procedure conforms with Network Time Protocol (NTP).

18. The apparatus according to claim 1, wherein the conventional SFP-compliant cage for which the housing is suitable for plugging into is a cage configured to receive a module selected from the group consisting of: a Small Form-factor Pluggable (SFP) module, an Enhanced Small Form-factor Pluggable (SFP+) module, a 10G Form-factor Pluggable (XFP) module, a 100G Form-factor Pluggable (CFP) module, and a Gigabit Interface Converter (GBIC) module.

19. A packet switched network (PSN) comprising a plurality of apparatuses for providing timing information, each apparatus comprising:
- a primary reference time clock (PRTC) that is operable to provide a reference time of day (ToD) and a reference frequency;
- a packet master clock that receives the ToD and reference frequency and is configured to distribute timing information to a slave clock in accordance with a timing over packet procedure responsive to the ToD and the reference frequency; and
- a housing that houses the PRTC and the packet master clock, the housing being suitable for plugging into a conventional small form factor (SFP) compliant cage to connect the packet master clock to a packet switched network (PSN).

20. A PSN according to claim 19 and comprising a slave clock that receives timing information distributed by a packet master clock comprised in an apparatus of the plurality of apparatuses.

21. A plurality of apparatuses for providing timing information, each apparatus comprising:
- a primary reference time clock (PRTC) that is operable to provide a reference time of day (ToD) and a reference frequency;
- a packet master clock that receives the ToD and reference frequency and is configured to distribute timing information to a slave clock in accordance with a timing over packet procedure responsive to the ToD and the reference frequency; and
- a housing that houses the PRTC and the packet master clock, the housing being suitable for plugging into a conventional small form factor (SFP) compliant cage to connect the packet master clock to a packet switched network (PSN);
- wherein the PRTC of at least one apparatus from the plurality of apparatus has a substantially same reference ToD and reference frequency as the PRTC of at least another apparatus from the plurality of apparatuses.

* * * * *